Dec. 1, 1970 W. T. MacCREADIE 3,544,989
JUDGING SYSTEM FOR COMPETITIVE SWIMMING ACTIVITIES
Original Filed Oct. 11, 1966 5 Sheets-Sheet 1

Fig.1

INVENTOR
William T. MacCreadie

BY Geik & Porter

ATTORNEY

Dec. 1, 1970 — W. T. MacCREADIE — 3,544,989
JUDGING SYSTEM FOR COMPETITIVE SWIMMING ACTIVITIES
Original Filed Oct. 11, 1966 — 5 Sheets-Sheet 4

INVENTOR
William T. MacCreadie
BY
ATTORNEY

Fig. 16

United States Patent Office 3,544,989
Patented Dec. 1, 1970

3,544,989
JUDGING SYSTEM FOR COMPETITIVE SWIMMING ACTIVITIES
William T. MacCreadie, R.D. 2,
Mifflinburg, Pa. 17844
Continuation of abandoned application Ser. No. 585,961, Oct. 11, 1966. This application Feb. 20, 1967, Ser. No. 617,111
Int. Cl. G08b 5/22
U.S. Cl. 340—323          22 Claims

ABSTRACT OF THE DISCLOSURE

An electrical timing system for swimming competitions including means for detecting the start of a race and for indicating false starts, means for detecting the finish of the race, means for recording the elapsed time of each competing individual or team, and means for indicating the order of finish. The system also provides means for monitoring relay races, providing an indication if a subsequent member of the team leaves the starting line before the preceding member reaches the line.

CROSS-REFERENCE TO RELATED APPLICATION

This application is a continuation of my application Ser. No. 585,961, now abandoned, filed Oct. 11, 1966.

FIELD OF THE INVENTION

The present invention relates to swimming competitions which are usually conducted in swimming pools, and more particularly to the automatic judging and timing of contestants in swimming meets who participate simultaneously and in closely adjacent parallel swimming lanes.

SUMMARY OF THE INVENTION

Usually such swimming meets are conducted in pools wherein there are four or more parallel swimming lanes; and manifestly the accurate judging and timing of the individual contestants presents numerous problems.

It has heretofore been proposed to provide a system which automatically judges and times the individual contestants, which is initiated by the firing of the starter's gun and which is terminated by the act of the swimmer in touching the end of the pool at the completion of the race.

In order to be acceptable, the apparatus must in no way interfere with the swimmer or be affected by extraneous influences such as water turbulence, etc.

Obviously, the installation and operation of such apparatus must not result in the reduction of the official length of any of the parallel swimming lanes; but fortunately most pools intended for competitive swimming events are so constructed as to be a little longer than official requirements.

It is among the objects of the present invention to provide a judging system for competitive swimming activities of the type described which is easy to operate and which possesses high accuracy and reliability.

Another object is the provision of a timing system of the class described which includes means whereby the sound waves emanating from the starting gun initiate the operation of the system,
stop-watches or other timing devices which record the finishing time of all of the contestants, a recording device which is automatically operated by each contestant upon arriving at the finish line, and
a selector means which ascertains and indicates, according to the number of each lane, the order in which the contestants finish.

It is also the object of this swimming device to protect the swimmer from voltage (110 volts) harm, hence all relay, light bulbs, etc., are selected to be used with 12 volt wet battery, which is charged by charging apparatus in a room which is adjacent the one containing the competitive swimming pool.

According to the present invention 12 volts is the highest voltage utilized anywhere in the system.

Another object is the provision of a relatively simple and inexpensive apparatus which attains the immediately foregoing objectives and is not affected by extraneous influences such as water turbulence, noises other than those created by the starter's gun, etc.

Still another object is accuracy and durability in service, together with relative ease and simplicity of installation and repair.

BRIEF DESCRIPTION OF THE DRAWINGS

The foregoing and other objects will become more readily apparent from the following detailed description, to be considered in conjunction with the annexed drawings, wherein like reference numerals designate like parts, and wherein.

DESCRIPTION OF THE PREFERRED EMBODIMENT

Figure 1:
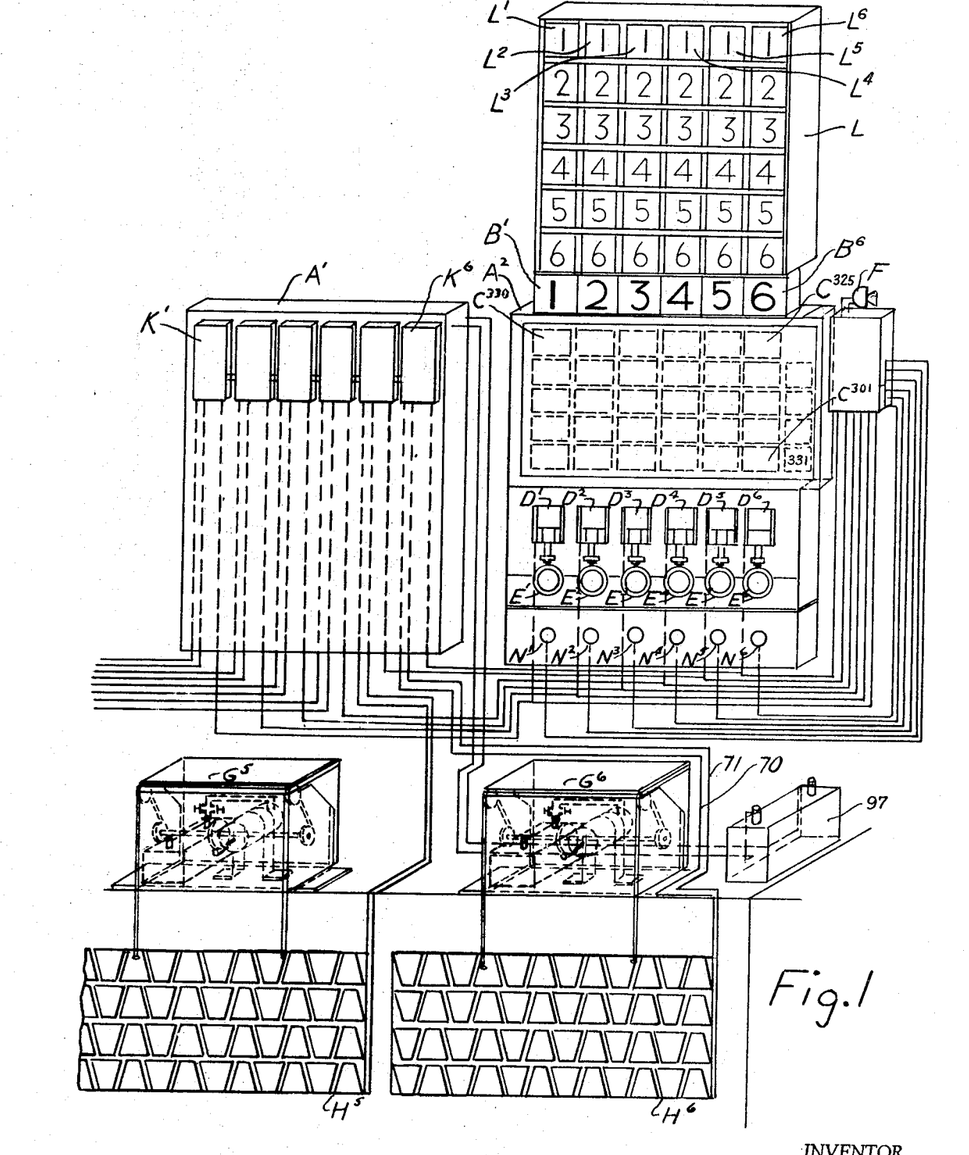
FIG. 1 is a schematic elevational view which partially illustrates an apparatus embodying the teachings of the invention as associated with a six-lane swimming pool, the upper portion of said figure representing a panel or wall-board with various indicating and recording instrumentalities thereon for the six lanes, and the lower portion, which is in perspective, representing recording devices which in the interests of simplicity are associated with only the fifth and sixth swimming lanes, it being understood that the first through fourth swimming lanes are provided with equivalent instrumentalities.

Referring more particularly to FIG. 1 of the drawings, the letters $A^1$ and $A^2$ (respectively) designate the left-hand and right-hand portions of a panel or wallboard which is disposed for convenient viewing by both officials and spectators. Near the top of the right-hand panel section $A^2$ is a series B of horizontally extending number boxes which identify the parallel swimming lanes of the swimming pool and which are consecutively designated $B^1$ through $B^6$.

In the embodiment of the invention described herein, six swimming lanes are represented but it will be understood by those skilled in the art that this is for illustrative purposes only and that the invention is in no way restricted in this respect.

Below the series B of consecutive and horizontally extending number boxes, on the right-hand section $A^2$ of the panel wall-boards which designate the swimming lanes, there is a series C of horizontally and vertically extending relays (hereinafter referred to as a "selector") The selector relays are designated at $C^{301}$ through $C^{330}$, and operate to automatically select the first, second, third, fourth, fifth and sixth lanes extending horizontally from left to right, and to select for each lane the order of finishing the race, the order being designated in vertically represented fashion. Thus, the winner of a race activates the relay in the lowermost horizontal row of selector C in the vertical column which corresponds to his lane. Similarly, the second place finisher will activate the relay in the second row of the selector column corresponding to his lane, and so on, each racer thus energizing one of the relays in the column of the selector corresponding to his lane.

The number of each lane selected will show automatically in lights above the selector, as will be explained more fully hereinafter.

Below the selector (as represented by the horizontally extending lighting arrangement provided by the selector C) is a horizontally extending series D of small solenoids $D^1$ through $D^6$ which operate individually a horizontally extending series E of stop-watches $E^1$ to $E^6$, respectively, or other timing devices, one of which is provided for each of the swimming lanes to be timed.

In the manner well known in the art, the solenoids $D^1$ to $D^6$ may be energized to both start and stop the watches or other time-recording devices. Means are provided to respond to the sound of the starting gun to activate all of the solenoids and thus start the timing watches; further means are provided to deactivate individual ones of the solenoids as the swimmers in their corresponding lanes finish the race, thus permitting the time consumed by each swimmer to be indicated or recorded.

Referring to the upper right-hand portion of FIG. 1 of the drawings the letter F designates a conventional microphone which is adapted to respond to the noise created by the starting gun (not shown) and initiate the operation of the stop-watches or other timing instrumentalities $E^1$ through $E^6$.

Preliminary to the actual swimming race, the contestants take their positions on one of a series G of starting boxes $G^1$ through $G^6$. These starting boxes are identical in construction and operation; therefore only two such boxes are illustrated in FIG. 1. The starting box for lane 6 and its associated instrumentalities is illustrated in FIG. 2 of the drawings and described immediately hereinafter.

Figure 2:
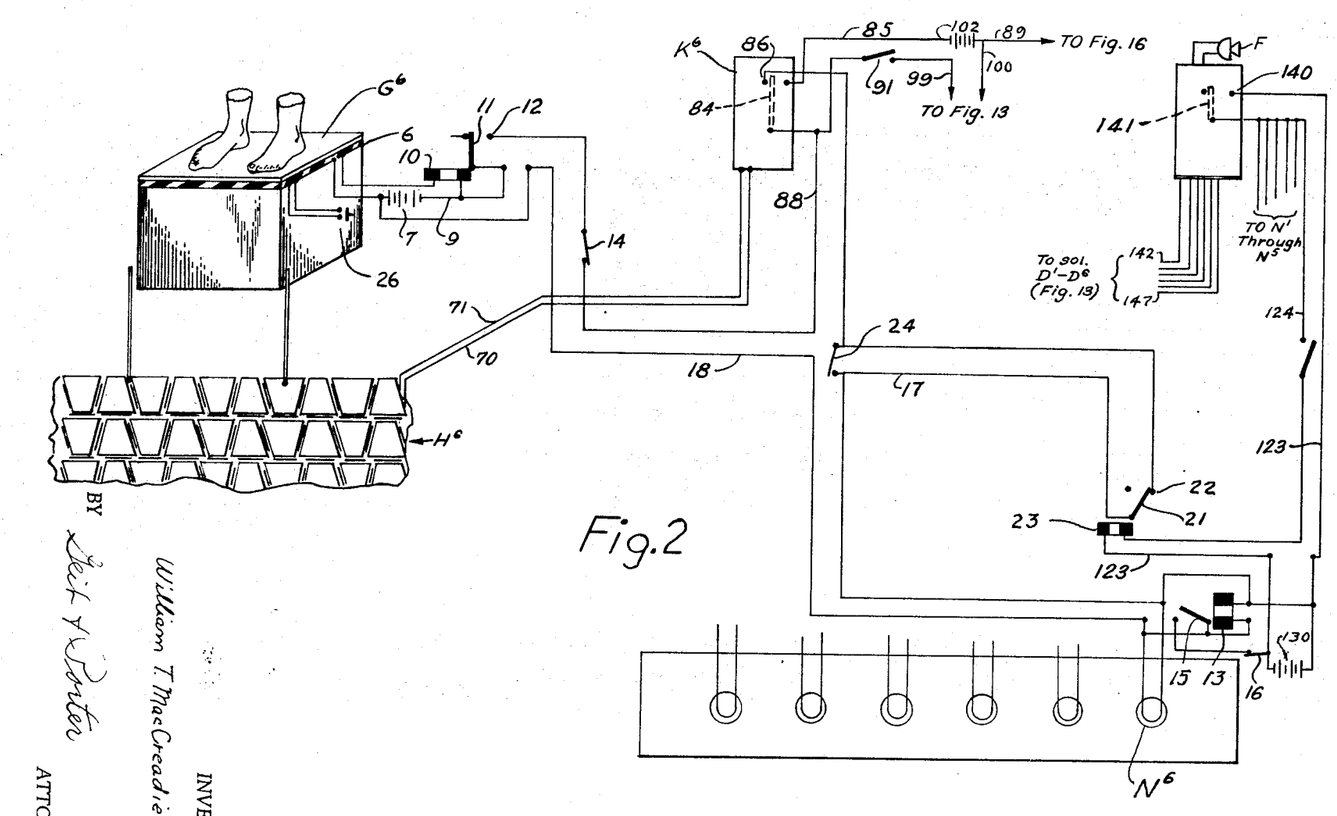
FIG. 2 is a diagrammatic view illustrating an electrical circuit and associated elements which are automatically operated by the swimmer in commencing and terminating his part in the judged competition.

In FIG. 2, the starting box is indicated at $G^6$; as the swimmer stands on it his feet press downwardly on a thin piece of aluminum or other suitable material, which, in turn, exerts downward pressure on a conventional rubber electric mat 6 which is disposed immediately therebelow. As shown, downward pressure upon the rubber electric mat 6 closes an electrical circuit which permits current to flow from a battery 7 through wire 9 to a relay coil 10, thus energizing said relay and drawing the movable arm 11 of the relay away from contact point 12. Energization of relay coil 10 thus holds open the circuit connected to point 12, which circuit includes normally closed on-off switch 14 and line 88.

The connection between movable arm 11 and contact point 12 remains open as long as the swimmer continues to stand on the starting box $G^6$, but closes immediately upon removal of the weight of the swimmer from mat 6.

Below the stop-watches $E^1$ through $E^6$ in FIG. 1 is a horizontally extending series N of red lights $N^1$ through $N^6$, one being provided for each of the swimming lanes for the purpose of indicating whether or not the swimmer in that lane has started correctly, and not "jumped the gun," as sometimes happens.

Figures 11, 12, 17:
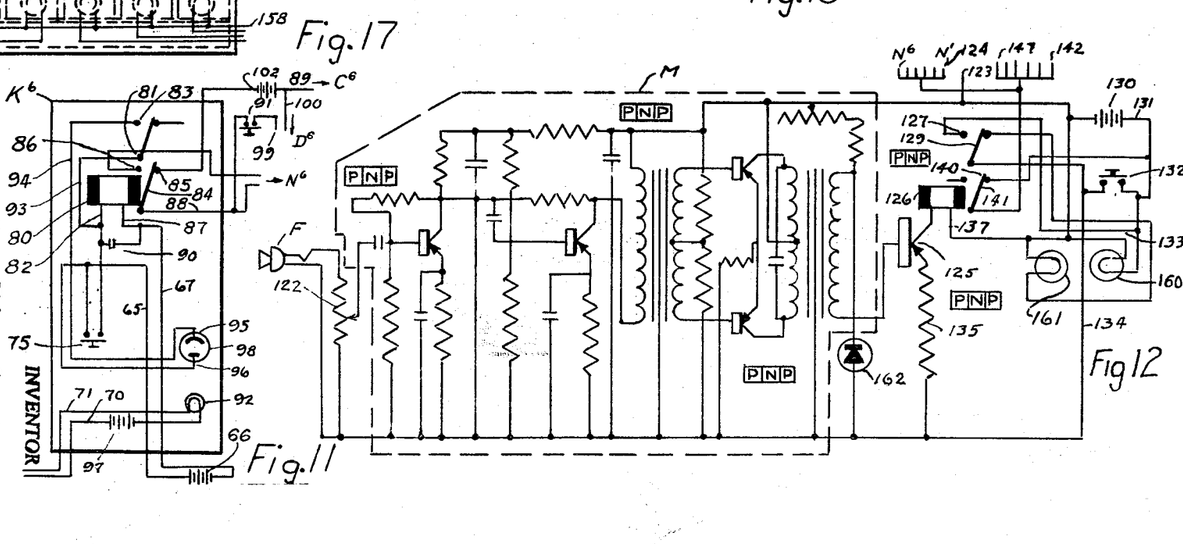
FIG. 11 illustrates the circuitry of the electronic control box associated with each of the starting boxes and recording mats.
FIG. 12 is another electrical circuit which illustrates the flow of electrical energy through various of the control elements as instituted by the sound waves emanating from the starting gun.
FIG. 17 is an elevational view of the showing of FIG. 15.

Should a swimmer dive into the pool from any of the starting boxes $G^1$ through $G^6$ before the microphone F picks up the sound of the firing of the starting gun (not shown), the circuit through mat 6 to the relay coil 10 corresponding to the starting box from which the swimmer dove is broken, permitting relay arm 11 to close the circuit at contact point 12. The closing of the circuit which includes contact point 12 permits a signal, or current, to flow from the battery 7, through on-off switch 14 and line 88 to contact point 86, through movable arm 84 of relay 80 (FIG. 11) in an electronic control box K corresponding to the lane in which the swimmer jumped the gun. Electronic control boxes $K^1$ through $K^6$ are diagrammatically illustrated in FIG. 1, the control box $K^6$ which corresponds to lane 6 being illustrated in detail in FIG. 11. It will be noted that each of the control boxes $K^1$ through $K^6$ are energized before the starting of the competition by closure of switch 75, as indicated in FIG. 11. From the contact point 86 the current flows through contact points 22, movable arm 21 of relay 23, through line 17 to the red light $N^6$, and thence through line 18 back to battery 7, thereby lighting warning lamp $N^6$. This current flow also energizes latching relay 13 which is connected across $N^6$, latching the relay by way of battery 130, line 123, normally closed reset switch 16, and movable arm 15. This latching circuit holds the red light N on even if the circuit from battery 7 is subsequently opened by the firing of the starting gun. Upon energization of the red light $N^6$, indicating that the swimmer in lane No. 6 has "jumped the gun," all of the competing swimmers are called back by the starting official, and the event recommenced.

The starting gun should, of course, be fired before any of the contestants leave the starting boxes $G^1$ through $G^6$, since this breaks the circuit between contact points 22 and movable arm 21 by closing the circuit which includes movable arm 141 and contact 140 (FIGS. 2 and 12) to energize relay coil 23 before relay 13 is energized and, accordingly, no red light will be energized.

The rubber electric mat 6 disposed on each of the starting boxes G is provided with means such as switch 26 which permits the electric circuit of the mat to be divided into two portions, a front portion where the toes of the swimmer normally rest when the swimmer is in his starting position, and a second portion corresponding to the location of the heels. When switch 26 is open, the front portion of the mat is removed from the pressure sensitive circuit and thus does not affect the operation of the relay 10 corresponding to each starting box. By so removing the front part of the mat from the circuit, the swimmer is required to keep his heels on the mat to maintain relay 10 in an energized condition. The switch 26 for each mat is opened at the start of every race and the corresponding red warning light N will illuminate if any swimmer raises his heels before the firing of the starting gun.

According to present custom, at practically all competitive swimming races there are two "relay races." In relay races, as presently performed, the start is the same as in any other race, except that after the first contestant jumps into the water, switch 24 is closed to bypass movable arm 21 of relay coil 23, and a second contestant (but on the same team) takes his place and waits until the first contestant on that team returns to the recording mat ($H^1$ through $H_6$) for his particular lane, Switch 75 must be closed after the second and each succeeding contestant takes his place on the starting box, so that the corresponding control box is energized.

It is important that the first contestant touch the recording mat for his particular lane before the second contestant on the same team jumps into the water. If the aforementioned second contestant jumps too soon, the appropriate red light on the panel or wall board is illuminated thereby indicating disqualification.

In conformity with the pattern described, the switch 26 is closed immediately after the start of a relay race so that the contestant on the same team, while standing on the starting box G, may stand up on his toes, or lift his heels, as is permitted in official relay races, without illuminating the corresponding red light N. The closing of switch 26 effectively increases the length of the rubber electric mat 6 so that downward pressure on the front of the starting box G will maintain the energization of relay 10, thus preventing illumination of the associated red light by the lifting of the heels, as would occur at the start of a race. In the race as thus far described, the race switch 91, which is located between each electronic control box K and its corresponding solenoid D, has remained open, i.e., is turned to the "off" position, to prevent any flow of current to the solenoids $D^1$ through $D^6$ or to the relays $C^{301}$ through $C^{330}$ and prevents them from operating.

Shortly before the last contestant on a team reaches the recording mat ($H^1$ through $H^6$) for his particular lane, the race switch 91 is turned "on" so that the corresponding solenoid D and selector relay in selector C will respond to his touching the recording mat in his lane. The signal generated by the touching of the mat after switch 91 is turned on thus serves to turn off the stop watch E corresponding to his lane and to illuminate the indicator light L corresponding to his lane and his order of finish in the race. Thus, the times of the stop watches $E^1$ through $E^6$ and the order in which the contestants finished may be detected and recorded on the panel or wall-board $A^1$ and $A^2$.

As the contestant in each of the six swimming lanes arrives at the finish line, one of the hands of the contestant will touch the recording mat ($H^1$ through $H^6$) for that particular lane; and this immediately discontinues the operation of the stop-watch or other timing and judging device which is associated therewith. When the first swimmer touches the mat in his lane, a current passing into the selector C in response to a signal in lines 70 and 71 (FIGS. 1 and 2) by way of the electronic control box K registers a number "1" in that particular lane. In similar manner, as the second swimmer touches the recording mat in his lane, the operation of the stop-watch or other timing device which is associated with that lane is discontinued and the current passes into the selector C and number 2 is illuminated in that lane, etc.

In the lower half of FIG. 1 of the drawings the recording devices for the fifth and sixth swimming lanes are shown at $H^5$ and $H^6$; as indicated earlier herein, identical devices $H^1$ through $H^4$ are provided for the swimming lanes 1, 2, 3 and 4, respectively.

According to a permissive embodiment, these recording devices $H^1$ through $H^6$ may take the form of individual rectangular mats approximately 74 inches in length and approximately 20 inches in height, one of which is disposed transversely of each of the swimming lanes and at the finish line thereof.

It is contemplated that the recording mats $H^1$ through $H^6$ will be positioned above the water in the swimming pool a sufficient distance to prevent their being contacted by the hands of the competing swimmers in the different swimming lanes until shortly before the finish of the event, at which time the said mats are rapidly lowered until they are partially immersed in the water, and can be easily reached by the swimmer.

Figures 3, 3A, 4, 5, 6, 7, 8, 9, 10:
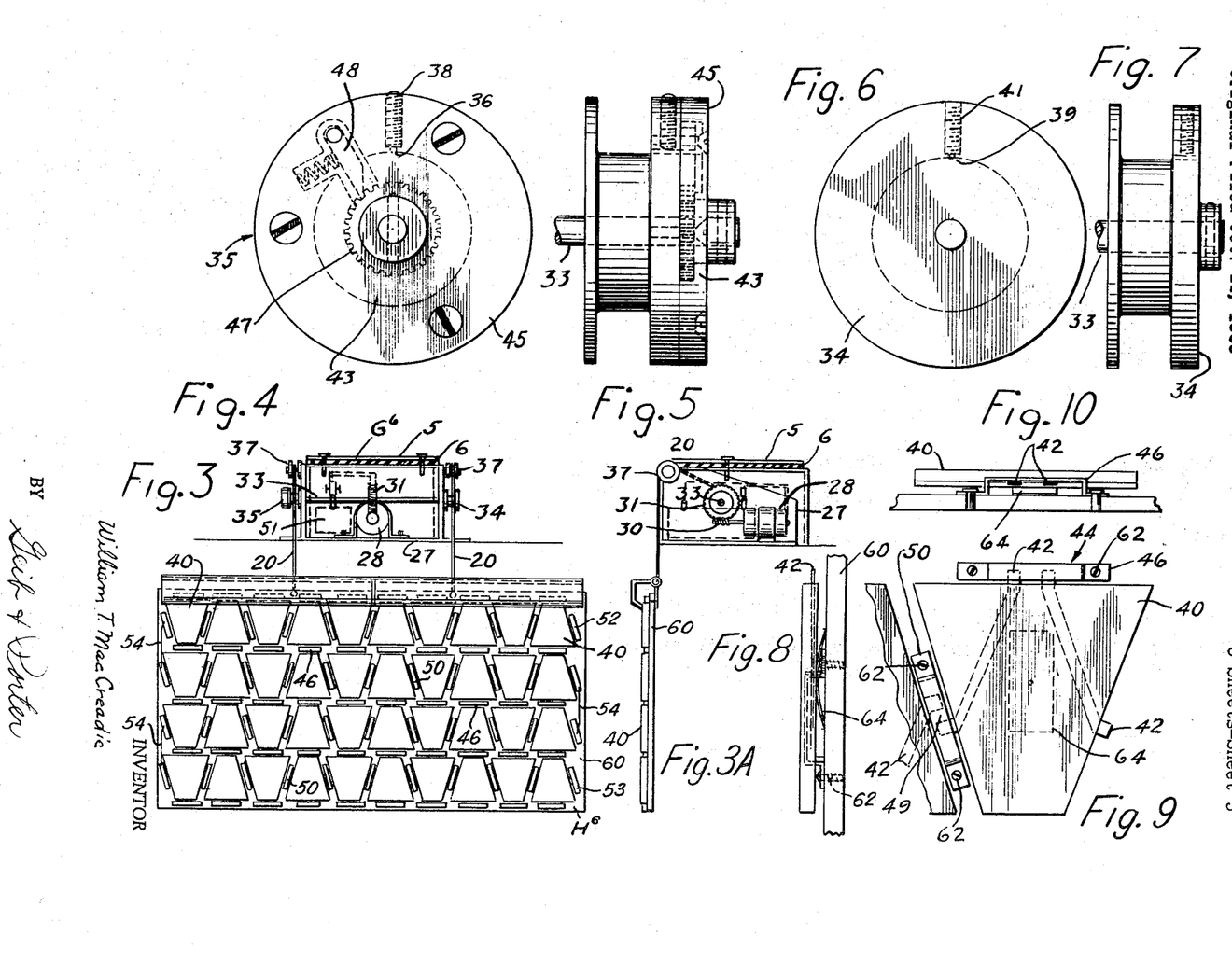
FIGS. 3 and 3A are frontal and side elevations, respectively, illustrating the starting box and the recording mat for one of the swimming lanes, i.e. the sixth lane.
FIGS. 4 and 5 are frontal and side elevational views, respectively, of one of the pulleys which form part of the starting box illustrated in the upper portion of FIG. 3, the said views, respectively, being on an enlarged scale.
FIGS. 6 and 7 are frontal and side elevational views which illustrate another and different form of pulley as used in conjunction with the pulley of FIGS. 4 and 5.
FIGS. 8 and 9 are side and front fragmentary views, respectively, on an enlarged scale, of two of the associated elements of the recording device which is illustrated in FIGS. 3 and 3A.
FIG. 10 is a fragmentary plan view of the showing of FIG. 9.

In FIG. 3 of the drawings, a suitable means for raising and lowering the recording mat $H^6$ is shown in frontal elevation as comprising a housing 27 which is secured to the floor of the pool immediately adjacent the finish line of each of the swimming lanes. Disposed in each of these housings 27 is a suitably controlled reversing electric motor 28 driven by a battery 51 through suitable switches. The shaft of motor 28 is provided with a worm 30 (see FIG. 3A) which drives worm gear 31 secured to a horizontally extending shaft 33, the ends of which are journaled in, and project from the end walls of said housing 27. The shaft 33 also may extend beyond the sides of the starting box $G^6$ which may be positioned inside or outside frame, or housing 27.

Referring to FIGS. 3 through 8, secured to the horizontally extending shaft 33 adjacent each of its ends is a small reel or spool as shown at 34 and 35. These spools 34 and 35 may be disposed within or without the housing 27 as desired; and to each of them is secured one end of a wire or small-diameter cable 20, the other end of which is attached to an appropriate portion of the upper edge of the corresponding recording mat (i.e. $H^6$ in the embodiment illustrated in FIG. 3).

The intermediate portions of the aforementioned wires are trained around elevated pulleys 37 which are rotatably mounted on the housing 27 adjacent the top thereof.

The spool 34 is shown as being of simple design, with its wire 20 secured thereto at 39 in any suitable manner, such as by means of a set screw 41 (FIGS. 6 and 7).

The spool 35 (FIGS. 4 and 5) comprises an inner hub member 43 which is secured to the horizontally extending shaft 33 and carries a relatively rotatable outer member 45 to which the wire 20 is secured at 36 by means of a set screw 38. A ratchet gear 47 is carried by the inner hub member 43 and the relatively rotatable outer member 45 is provided with a cooperating spring-loaded ratchet 48.

The foregoing arrangement permits fine adjustment, through relative rotation of the outer member 45 and hub 43, in the event the recording mat associated therewith is not level.

The mats $H^1$ through $H^6$ in the six swimming lanes are preferably identical in size and construction; and may acceptably be one of a number of different types. However, the present invention contemplates a novel mat which is believed particularly advantageous and which is illustrated in some detail in FIGS. 3, 8, 9 and 10.

Referring particularly to FIG. 3, each of the aforementioned mats comprises superposed rows of alternately arranged truncated triangular elements 40 which are adapted for vertical disposition.

Each of these triangular elements 40 may be composed of a pair of small plates of suitable plastic, such as Plexiglas, which are cemented together with a pair of narrow copper strips 42 disposed therebetween, as shown most clearly in FIGS. 8, 9 and 10. The copper strips are so positioned between the joined plastic plates as to converge toward the base of the triangle formed thereby. These convergently disposed ends of the copper strips 42 extend angularly from between the joined plastic plates, as shown at 44, and by means of a concavo-convex spring 64 are pressed against raised connector bar 46.

Referring to FIG. 9, the opposite ends of the copper strips 42 extend angularly from between the side edges of the joined triangular plastic plates, as shown at 49 and each of them is pressed by the concavo-convex spring 64 against the adjacently disposed connector bar 50.

Since the next adjacent triangular element 40 of a given horizontally extending row is inverted, a single and intermediately disposed connector bar 50 will serve both of said adjacent triangular elements.

It will also be noted that there is an end connector 52 at one end of the upper horizontal row of said triangular elements 40 (see FIG. 3), and an end connector 53 at one end of the lower horizontal row. The horizontal rows are connected in electrical series between connectors 52 and 53 by means of leads 54.

Disposed behind and in parallel with the superposed rows of alternately arranged triangular elements 40, and also forming part of the mat $H^6$, is a large sheet or panel 60, of suitable plastic, such as Plexiglas, to which the parts 46 and 50 are attached by means of screws 62 (FIG. 9).

The plastic sheet 60 backs up the adjacent superposed rows of alternately arranged triangular elements 40 (which may, for example, comprise one hundred and forty in number), and each of the aforementioned connector bars or brackets 46, 52 and 53 (which are electrically connected with the copper strips 42) is secured to the adjacent surface of said plastic sheet, as by means of screws 62. These connector bars support elements 40 by means of strips 42, holding the elements in place and providing a complete electrical circuit between the end connectors 52 and 53.

Referring to FIG. 1 of the drawings, electrical energy is supplied to the copper strips 42 of the triangular elements 40 through leads 70 and 71 which are connected to a suitable source of electricity, such as a battery 97 (FIG. 11), which may be located in the control box K corresponding to the particular mat. Current passes from lead 70 to bar 52 at one end of the upper horizontal row of mat elements, to one connector strip 42 of element 40, through connector bar 46 to the other connector strip 42 of elements 40, thence to connector bar 50 and through the connector strips 42 of the next element 40, and so on through the various elements to bar 53 at the end of the bottom row of elements, then through lead 71 back to the electronic control box K.

According to swimming rules presently in force, the competing swimmers may jump-off from starting boxes ($G^1$ through $G^6$) thirty inches above the level of the water in the swimming pool; these may acceptably be formed by the housing 27 containing the reversible electric motors 28, etc. As previously described motors 28 lower and raise their corresponding recording mats $H^1$ through $H^6$ which are energized by a battery source. The mats are lowered into their respective swimming lanes shortly prior to the finish of the event and are deenergized by contact of the swimmer's hand with one or more of the triangular elements 40, breaking the circuit between contacts 52 and 53 and thus stopping the stop-watch $E^1$, $E^2$, $E^3$, $E^4$, $E^5$ and $E^6$ for that particular swimming lane and recording the winner in the manner to be described.

As has been noted, a pair of electrical conduits 70 and 71, extends from each of the recording mats $H^1$ through $H^6$ to a corresponding one of the series K of electronic control boxes which are indicated at $K^1$ through $K^6$, respectively.

Associated with each of these electronic control boxes $K^1$ through $K^6$ is a push-button type control switch 75 (see FIG. 11), the purpose of which will appear hereinafter.

Disposed within the electronic control box $K^6$ is a double-pole, double-throw relay having an operating coil 80, a movable contact arm 84 and a pair of contacts 85 and 86. At rest, contact arm 84 closes the circuit to contact 85; when coil 80 is energized, contact 86 is closed.

The operating coil 80 of the DPDT relay is energized prior to the start of a race by pressing the push-button type control switch 75 completing a circuit from coil lead 82 of relay coil 80, through switch 75, thence through wire 65 to the battery 66, and return from the battery through line 67 to coil lead 87. Energization of coil 80 also shifts a second movable arm 81, closing contact 83 to provide a self-holding circuit for coil 80.

The self-holding circuit for relay coil 80 now may be traced, beginning at coil lead 82 through line 93, through movable arm 81 to contact 83, through wire 94, to electrode 95 on photoconductive cell 98 and thence electrode 96 to line 65 and battery 66, then through wire 67 and to coil lead 87 and coil 80.

The flow of energizing current is through the photoconductive cell 98, which, in turn, is controlled by a small light-bulb 92. As shown, the light-bulb 92 is in a separate or independent circuit energized by battery 97. This circuit by means of wires 70 and 71, passes through recording mat $H^6$. This mat $H^6$ remains energized until the swimmer touches it, thus breaking the circuit. Then the light bulb 92 is extinguished momentarily, and the photoconductive cell 98 becomes resistive, whereup the operating coil 80 of the relay is deenergized. This shifts movable arm 84 to contact 85, which permits current in the form of a "finish" signal to flow to the selector C and the solenoids D through battery source 102 and lines 89 and 100.

A condenser 90 connected across the coil 80 takes care of the back-electromotive force generated upon de-energization of the coil.

Referring to FIG. 11, when coil 80 is energized, there is a circuit through contact 86 which carries the current to the red light $N^6$ by way of line 88 and relay 10 (FIG. 2) so that the warning circuit is ready for operation in the event of a false start, this latter circuit being disabled by a proper start of a race, as will be described.

In FIG. 12 there is illustrated the gun amplifier and only one of them is necessary. The element generally identified at M is a standard amplifier and is readily available on the market. On the left side is microphone F, and potentiometer for adjustment 122. On the right side, switch 132 provides an energizing circuit for relay coil 126 from battery 130, through wire 131, through 132, through wire 134, through resistor 135, through the emitter-collector junction of transistor 125, through coil 126, to 137, and through wire 138, back to battery 130. Energization of coil 126 shifts movable arms 129 and 141 to close contact 127 and open contact 140, the shifting of arm 129 serving to latch the relay so that it remains energized when switch 132 is released. The latching current flows from the battery 130 through 131; 133; 127; 129; 134; 135; 125; 126; 137 and 138, to battery 130. The numerals 160 and 161 identify indicator light bulbs for showing the condition of relay 126.

Number 162 is a diode to control direction of current.

Initially, transistor 125 is biased to conduction and relay 126 is energized by closing switch 132. When the starting gun is fired, the sound produces a pulse at the output of microphone F, which pulse is amplified in amplifier M to produce a cut-off voltage at the base of transistor 125. This cuts off the transistor for the duration of the pulse, and the relay is de-energized, with movable arms 129 and 141 taking the positions shown in FIG. 12. The relay 126 remains de-energized until reset by closure of switch 132. Contact 140 on the load side closes, permititng current to flow to the solenoids D, through lines 142 to 147.

Figure 13:
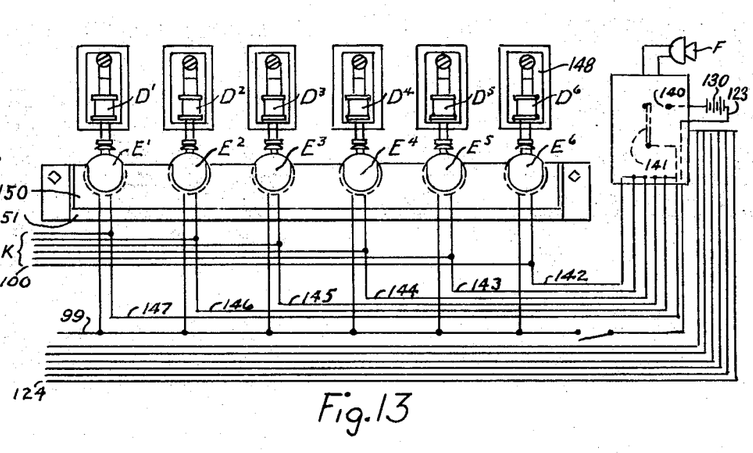
FIG. 13 is a schematic view illustrating the microphone which picks up the sound waves emanting from the starter's gun and also a series of six stop-watches, one for each of the six lanes of the swimming pool, together with a partial wiring diagram therefor.

FIG. 13 shows solenoids and their associated watches E. Current is fed from battery 130 through the contact of relay 126 to the small solenoids $D^1$, $D^2$, $D^3$, $D^4$, $D^5$, $D^6$, which start the watches by exerting a downward force on the stem of each watch. All watches start at the same time, being energized by the parallel-connected solenoids through wires 142, 143, 144, 145, 146 and 147, the solenoid armatures returning to their initial positions when at the end of the race the solenoids are released in the manner to be described.

Figures 14, 15:
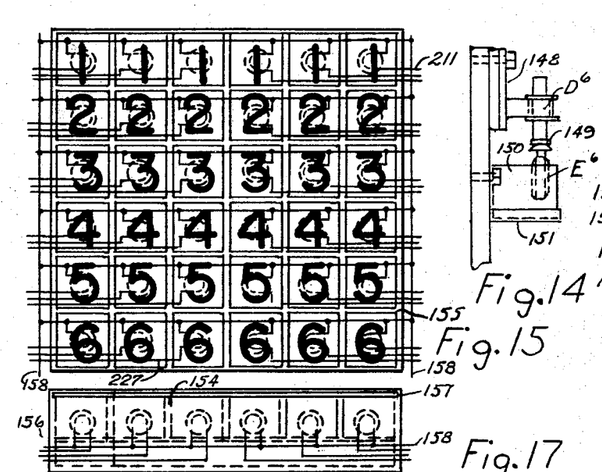
FIG. 14 is a side elevational view of one of the stop-watches of FIG. 13.
FIG. 15 is a partial electrical circuit for the various signal lights which form part of the numerous indicating elements of the apparatus.

FIG. 14 shows watch $E^6$ being activated by the armature 149 of solenoid $D^6$; each solenoid is held in position by a mounting frame 148. The watches are held in position by clamp 151 and long box 150. Watches $E^1$–$E^6$ are stopped by the same solenoids which started them, the stopping operation being controlled from pool boxes $K^1$, $K^2$, $K^3$, $K^4$, $K^5$ and $K^6$, respectively. As shown in FIG. 11, $D^6$ is operated through wires 100 and 99 and battery 102 by the closure of contact 85 when relay coil 80 is released by a swimmer touching mat $H^6$. Switch 91 disconnects current from selector C and solenoids D.

FIGS. 15 and 17 illustrate the number of small lights which form sets of the numbers 1, 2, 3, 4, 5, to 6. There are six sets of these shown in two views one for each lane $L^1$, $L^2$, $L^3$, $L^4$, $L^5$ and $L^6$.

The numbers one to six are arranged vertically. This composite box of thirty-six small boxes is made of wood or other suitable material. Partitions 154 divide the box vertically and partitions 155 divide it horizontally. There is a partition at the back of the small squares to support the light bulb sockets. Hence there are 36 sockets with 36 light bulbs. A piece of glass 157 with numbers painted on it in the proper places slides down over the bulbs. When the bulb lights behind a selected number, it will light that number only. Wire 158 is the negative (common) wire, and is connected to one side of each bulb. The other wires carry positive voltages from their corresponding relays in selector C. If the winner arrives in lane 2, then figure one will light up in that lane. If the second swimmer comes in in lane 4, then figure two will light up in lane 4, etc.

Figure 16:
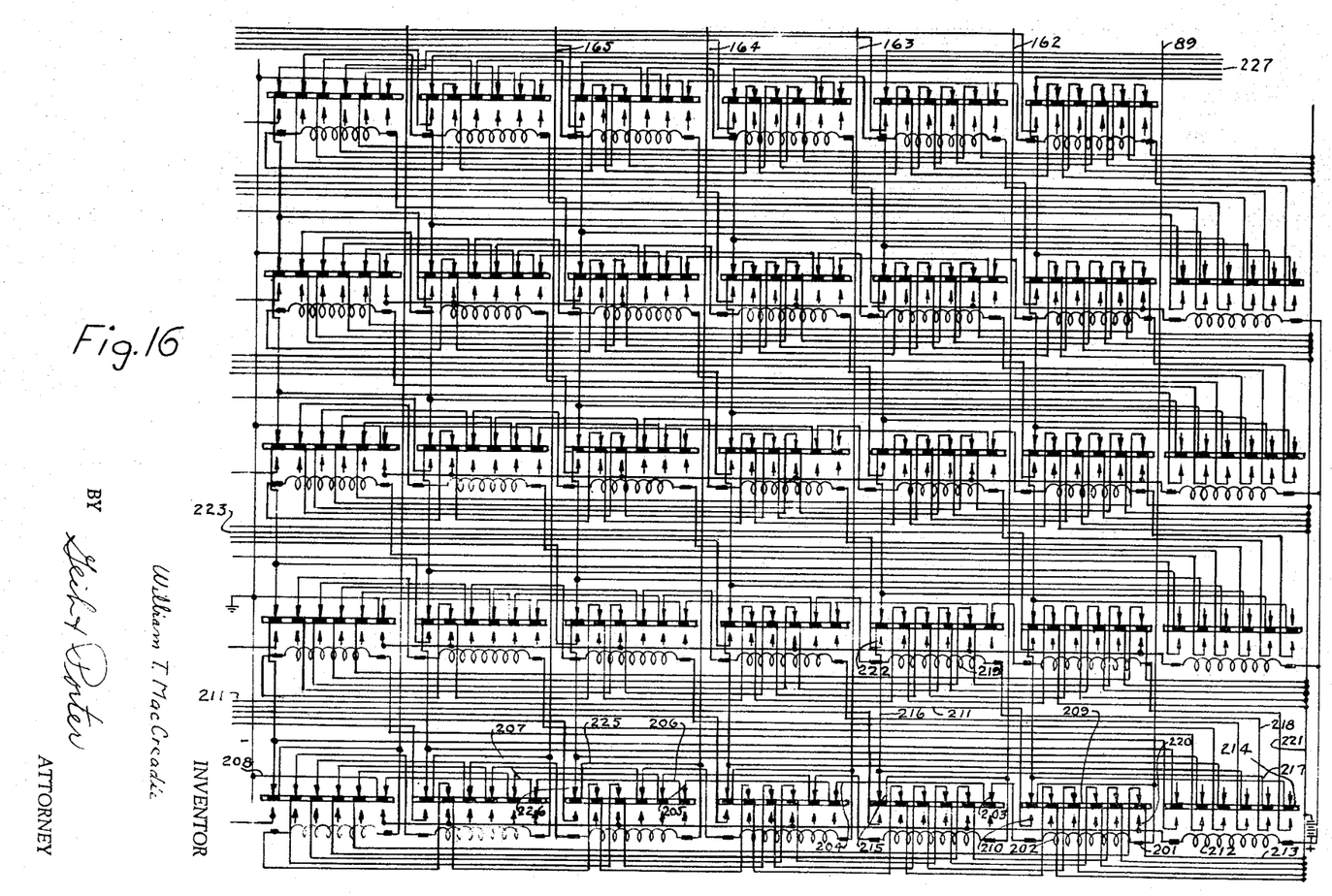
FIG. 16 is a wiring diagram of the electrical relays which comprise the selector system for operating the lights of FIG. 15 to indicate the order in which the swimmers finish the race.

FIG. 16 shows the wiring for the relays of the selector C which automatically selects the winner, second, third, etc., in the several lanes. Immediately following is a chart of reference table for the relays in the selector C. The relays 301 through 330 correspond to the relays $C^{301}$ through $C^{330}$ illustrated in FIG. 1 and are the relays which operate the indicator lights L. Sequencing relays 331 through 334 respond to the energization of any relay in their horizontal rows to prevent energization of a second relay in that row, thus shifting the second energization from the bottom row to the next row up and the third energization to the row above that, and so on. Thus, in effect, each sequencing relay is connected between two horizontal rows, and shifts incoming signals from one to the other. Each relay is a six-pole, double throw relay the contacts of which are illustrated in FIG. 16 by arrows. The following chart identifies the relays in FIG. 16, the numbered relays appearing in FIG. 16 in the relative positions indicated on the chart.

| 330 | 329 | 328 | 327 | 326 | 325 |     |
|-----|-----|-----|-----|-----|-----|-----|
| 324 | 323 | 322 | 321 | 320 | 319 | 334 |
| 318 | 317 | 316 | 315 | 314 | 313 | 333 |
| 312 | 311 | 310 | 309 | 308 | 307 | 332 |
| 306 | 305 | 304 | 303 | 302 | 301 | 331 |

As conditions require, one of the relays 301, 302, 303, 304, 305 or 306 in the bottom row of this chart registers first place: that is, first place must be indicated through one of these relays. Second place will be indicated through one of the relays in the second row from the bottom of the chart, namely 307, 308, 309, 310, 311, 312; etc.

There are six lead-in wires to the selector relays, which wires lead from the electronic control boxes $K^1$–$K^6$ and are energized by their corresponding recording mats H. These lead-in wires are numbered 89, 162, 163, 164, 165 and 166 and respond to de-energization of the relays in control boxes $K^6$, $K^5$, $K^4$, $K^3$, $K^2$ and $K^1$, respectively, and the only current which flows into these relays is from the lead-in wires.

Lead-in wire 89 corresponding to lane 6 comes in at the top of selector box C and drops vertically past relays 325, 319, 313, 307 and 301. The only relay where the current from 89 can come in is 301 which is first place in the bottom row. The other relays are open so there is not a complete circuit through to the negative. The current enters relay 301 at point 201, passes through coil 202 to point 203 on relay 302, leaves by wire 204 to 205 on relay 304, to 206 and 207 on relay 305, and 208 on relay 306, and to negative ground. Since all points are normally closed, relay 301 becomes energized and movable bar 209 makes contact with the associated lower points (arrows). Point 210 makes contact with lead-in wire 89, and current passes out by wire 211 to top light 1 in righthand column in FIG. 15, which column corresponds to lane 6.

As soon as relay 301 is energized, current from a separate positive battery source passes through coil 212 on reactor relay 331, through contact point 220 and movable bar 209 to wire 213, to negative line 221, thus energizing relay 331. This opens up all lanes to receipt of signals representing second place, as follows.

Since all six of the lanes are the same, one will be explained. Movable bar 214 in relay 331 drops down to contact points (arrows) therebelow.

Wire 215, which leads from input line 162, makes contact with lead 216 through the movable bar associated with relay 302 since relay 302 is not energized, then to 217, through bar 214 to line 218, and to coil 219, permitting relay 308 to be energized upon occurrence of a signal on line 162. Energization of relay 308 in this manner opens the circuit of vertical wire 216 and prevents lead-in current such as that which appears on line 162 from working into any other relay in the same vertical position. If line 216 was not open at 308, there might otherwise result (for example) an indication of a second and fourth or fifth place in the same lane.

The preceding sequence of operation has assumed that the first finisher in a race was swimming in lane 6. If the next swimmer to finish is in lane 5, for example, recording mat $H^5$ will activate electronic control box $K^5$, thus producing a signal on lead-in wire 162 in selector C. (FIG. 16). However, this current cannot flow into any relay of the bottom row 301 through 306, which row represents first place, since relay 301 has been energized, thus opening all its upper contact points. The case would be the same for each of the other lead-in wires from electronic control boxes $K^1$ through $K^4$, since a complete circuit must be made through one relay coil and contact points on each of the remaining five relays to illuminate a lamp in the first row. Although the operation of sequencing relay coil 331 prevents the current from lead-in wire 162 from flowing into the relays in the bottom row, the current will be able to proceed to the row above, which represents second place, provided that this row has ben made ready as hereinbefore described, and thus will energize relay 308.

Since relay 308 is energized by the second-place finish in lane 5, point (arrows) 222 makes contact with line 223 which places a number 2 in the fifth lane in light, L, etc.

Designating the rows of the relays in the selector C, as represented in FIG. 16, and in the chart or reference table as set forth earlier herein, as horizontal, and the columns thereof as vertical, the requirement that the current from 202 or any corresponding coil in that row must move horizontally prevents two relays being energized in the same row. Similarly, the requirement that current must move vertically through the relays prevents two relays from being energized in the same column; since it must go to the bottom, then up to second, third or fourth, etc. relays.

The first five places are obtained in the above manner. Sixth place must be registered in a different way. Since five rows give five places, all rows are taken, but there is one lead-in wire representing the sixth swimmer, as there are six columns. It may be any one of the lead-in wires. Suppose it is lead-in wire 164; a current on this wire flows down 164 to the relay 304 near the bottom of selector C and, since all relays in this column are closed, it moves through line 225 and the movable bar associated with relay coil 304 to line 226, up through contacts on relays 310, 316, 322 and 328 and out 227 to illuminate the lamp indicating sixth place for that lane. Since this represents the last place finisher, there will only be one column like this for each race.

Thus there has ben shown and described a specific embodiment of a new and novel system for automatically judging and timing swimming competitions, illustrating the the fundamental features of the invention.

What I claim as new and desire to secure by Letters Patent is:

1. In a system for automatically judging competitive individual or relay swimming events occurring in a plurality of parallel swimming lanes, each lane being assigned to a particular swimmer or team of swimmers and each lane including a starting station and a finish line:
   first sensing means at each of said starting stations responsive to the presence of a swimmer and adapted to produce a first signal when said swimmer leaves said starting station;
   second sensing means for each swimming lane adapted to produce a second signal when touched by a swimmer;
   control circuit means for each swimming lane including first relay means responsive to said second signal to produce a finish signal, said finish signals being produced in a time sequence corresponding to the order in which said second sensing means are touched at the end of a swimming event;
   selector means comprising a plurality of selector relays electrically interconnected in rows and columns, the finish signal from each swimming lane being applied to a corresponding column of selector relays, each said finish signal being applied to said selector means in its time sequence to activate a selector relay in succeeding rows;
   and indicator means corresponding to each selector relay and responsive to each activated relay to provide an indication of the order of finish of said swimmers.

2. The system of claim 1, further including warning means for each lane normally responsive to said first signal in a team swimming event to indicate disqualification, said control circuit means further including means responsive to said second signal to disable said warning means in its corresponding lane when said second signal precedes said first signal in time, whereby said warning means is activated only if a swimmer in a lane leaves said starting station before a preceding swimmer touches said second sensing means in said lane.

3. The system of claim 2, further including means for producing a start signal at the beginning of a swimming event, and means responsive to said start signal for disabling said warning means, whereby said warning means for a particular lane is energized to indicate a false start if the swimmer in that lane leaves the corresponding starting station prior to the production of said start signal.

4. The system of claim 1, further including warning means for each lane normally responsive to said first signal, and means for disabling said warning circuit.

5. The system of claim 1, further including a timing means for each of said lanes, each of said timing means being activated by said start signal at the start of said swimming event and each of said timing means being deactivated by the said finish signal from its corresponding control circuit means, whereby the length of time required for the swimmer or team of swimmers in each lane to complete said event is recorded.

6. The system of claim 4, wherein said first sensing means comprises a pressure-sensitive mat responsive to the presence of a swimmer to energize a second relay means, the decrease in pressure caused by said swimmer leaving said mat de-energizing said relay and closing a circuit to said warning means, the closure of said circuit producing said first signal.

7. The system of claim 6, wherein said means responsive to said start signal comprises a third relay means in series with said circuit to said warning means.

8. The system of claim 7, further including normally open bypass switch means for removing said third relay means from said circuit to said warning means, said bypass switch being closed to bypass said third relay means after the start of said swimming event.

9. The system of claim 8, wherein said warning means comprises a fourth relay means responsive to said first signal, a warning lamp in parallel with said fourth relay means, and self-latching means for said fourth relay means to hold said warning lamp on after receipt of said first signal.

10. The system of claim 1, wherein said means for producing a start signal includes a microphone for sensing the sound made by a starting gun and producing an electrical pulse in response thereto, a fifth, normally-energized relay means, and amplifier means connecting said microphone to said fifth relay means, whereby said pulse de-energizes said fifth relay means to produce said start signal.

11. The system of claim 1, wherein said second sensing means comprises: a recording mat having a plurality of superposed rows of pressure-sensing elements, each element including conductor means; connector bars located between adjacent elements; and spring means for urging said conductor means of each element against adjacent connector bars, whereby said conductor means hold said elements in place on said mat and serve to connect said elements in electrical series, said second signal being produced when any one of said elements is depressed sufficiently to break said electrical series connection.

12. The system of claim 11, further including a source of power and an electric lamp in series circuit with said elements of said recording mat, said lamp being illuminated until said series circuit is broken, the extinguishing of said lamp being accomplihed by said second signal.

13. The system of claim 1, wherein said second sensing means comprises a recording mat which is removably disposed at said finish line.

14. The system of claim 13, further including means for mounting said recording mat, said last-named means including a housing, reversible motor means within said housing; pulley means driven by said motor, and cable means connected between said mat and said pulley means, whereby rotation of said motor in one direction lowers said recording mat to said finish line, and rotation of said motor in the opposite direction removes said recording mat from said finish line.

15. The system of claim 1, wherein each of said control circuit means further includes switch means which may be closed to prevent said finish signal from reaching said selector means, said switch means for each lane normally being closed during a team competitive event until the last swimmer on the team swimming in the corresponding lane is nearing the finish line, thereby preventing premature activation of said selector means.

16. The system of claim 3, said selector means further including a sequencing relay electrically connected between each of said selector rows, said sequencing relays preventing activation of more than one selector relay in any selector row, and thus determining which selector relay in a selector means column is activated by its corresponding finish signal, whereby the initial one of said finish signals in said time sequence activates the selector relay in the first row of its corresponding column, and thereby activates the sequencing relay electrically connected to said first row to cause the next one of said finish signals in said time sequence to activate the selector relay in the next row of its corresponding column, and thereby activating the sequencing relay electrically connected to said next row, and so on, until a selector relay in each row is activated.

17. The system of claim 16, wherein said indicator means comprises an indicator lamp connected to each of said selector relays for energization upon activation of their respective selector relays.

18. The system of claim 5 wherein each of said timing means includes watch means, and solenoid means for starting and stopping said watch means.

19. In a system for automatically judging competitive events occurring in a plurality of parallel lanes, each lane being assigned to a particular competitor or team of competitors and each lane including a starting station and a finish line:

first sensing means at each of said starting stations responsive to the presence of a competitor and adapted to produce a first signal when said competitor leaves said starting station; second sensing means at the finish line of each lane and adapted to produce a second signal when touched by a competitor; selector means and indicator means for said system; a control circuit for each lane, each said control circuit being responsive to a corresponding second signal produced at the end of a race to apply a finish signal to said selector means, said selector means comprising a plurality of selector relays electrically interconnected in rows and columns, one column being provided for each lane, said rows corresponding to the order of finish which is to be indicated, the said finish signals from each control circuit being applied to said selector means in a time sequence corresponding to the order in which said competitors finish said event, each finish signal activating a selector relay in its corresponding column, the row in which said selector relay is energized for each lane corresponding to the order of finish of said competitors, said indicator means being responsive to each said activated relay to indicate said order of finish.

20. The system of claim 19, wherein said selector means further includes sequencing means for preventing activation of more than one selector relay in any selector row.

21. The system of claim 20, wherein said sequencing means comprises a sequencing relay electrically connected between each of said selector rows, the initial finish signal serving to activate the selector relay in the first row of its corresponding column, thereby activating the sequencing relay electrically connected to said first row to cause the next one of said finish signals to activate the selector relay in the second row of its corresponding column, thereby activating the sequencing relay electrically connected to said second row, and so on, until a single selector relay is activated in each row.

22. The system of claim 21, wherein each said selector relay, when activated, prevents activation of another selector relay in its corresponding column.

References Cited
UNITED STATES PATENTS 3,366,849    1/1968    De Raedt et al. ____ 340—147X ALVIN H. WARING, Primary Examiner M. SLOBASKY, Assistant Examiner U.S. Cl. X.R.

340—147